US012730921B2

(12) United States Patent
Sheridan et al.

(10) Patent No.: US 12,730,921 B2
(45) Date of Patent: Sep. 8, 2026

(54) AUTOMATED IDENTIFICATION OF SENSITIVE DATA ACCESS BASED ON SOURCE-CODE ANALYSIS

(71) Applicant: Checkmarx Ltd., Ramat Gan (IL)

(72) Inventors: Eric Sheridan, Lewes, DE (US); Harshit Naresh Chitalia, Mountain View, CA (US); Harshil Parikh, San Jose, CA (US)

(73) Assignee: Checkmarx Ltd., Ramat Gan (IL)

( * ) Notice: Subject to any disclaimer, the term of this patent is extended or adjusted under 35 U.S.C. 154(b) by 105 days.

(21) Appl. No.: 18/949,735

(22) Filed: Nov. 15, 2024

(65) Prior Publication Data

US 2025/0165637 A1 May 22, 2025

Related U.S. Application Data

(60) Provisional application No. 63/600,506, filed on Nov. 17, 2023.

(51) Int. Cl.
*G06F 21/62* (2013.01)

(52) U.S. Cl.
CPC ................................ *G06F 21/6218* (2013.01)

(58) Field of Classification Search
CPC ........................... G06F 21/6218; G06F 21/577
See application file for complete search history.

(56) References Cited

U.S. PATENT DOCUMENTS 10,200,407 B1 * 2/2019 Dawkins ................. H04L 51/18
2010/0205673 A1 * 8/2010 Burrell .................. G06F 21/577 726/25
2012/0304273 A1 * 11/2012 Bailey ................ G06Q 20/3829 726/9
2012/0321078 A1 * 12/2012 Chambers ............. G06F 15/173 380/44
2013/0103685 A1 * 4/2013 Preneel ................ G06Q 20/385 707/769
2015/0067327 A1 * 3/2015 Lipton .................. H04L 63/083 713/168
2017/0214521 A1 * 7/2017 Busch ................... H04L 9/0618
2018/0107478 A1 * 4/2018 Codato ..................... G06F 8/71
2018/0189502 A1 * 7/2018 Kumar .................. H04L 9/0863

* cited by examiner

*Primary Examiner* — Harunur Rashid
(74) *Attorney, Agent, or Firm* — Meitar Patents Ltd.; Daniel Kligler

(57) ABSTRACT

A system for facilitating the identification of sensitive data access based on source-code analysis is provided. During operation, the system can determine whether a repository in a source-code management platform is pertinent to security. If the repository is pertinent to security, the system can determine whether a respective source code file in the repository is pertinent to security. If the source code file is pertinent to security, the system can determine a set of symbols from the source code file and determine, based on the set of symbols, whether the source code file accesses sensitive data. If the source code file accesses sensitive data, the system can present information associated with the source code file in a user interface.

17 Claims, 6 Drawing Sheets

AUTOMATED IDENTIFICATION OF SENSITIVE DATA ACCESS BASED ON SOURCE-CODE ANALYSIS

RELATED APPLICATION

This application claims the benefit of priority under 35 U.S.C. 119(e) to U.S. Provisional Patent Application Ser. No. 63/600,506, titled "Automated Identification of Assets Processing Sensitive Data via Source Code Analysis," by inventors Eric Sheridan, Harshit Naresh Chitalia, and Harshil Parikh, filed on 17 Nov. 2023, the contents of which are incorporated by reference herein.

BACKGROUND

Field

The disclosed embodiments generally relate to enabling intelligent application security. More specifically, the disclosed embodiments relate to implementing automated identification of source code accessing sensitive data.

Related Art

Over the past few years, the widespread adoption of Cloud and DevOps culture has enabled engineering teams to significantly increase software development speed, such that moving from code commit to the cloud happens in a matter of hours. However, this software engineering trend, coupled with the fact that engineering teams have significant ownership in the choice of languages, frameworks and tools they use, have also made it increasingly more difficult to enforce application security standards. As a result, while software engineers continue to push code rapidly, application security teams face increasingly higher challenges to identify and manage risks being introduced by the code development activities.

While security teams are struggling to adapt to the current DevOps trend, they are forced to engage in large amounts of manual work to triage and prioritize false positives and noise from security tools involved in DevOps processes. In some cases, security teams may not match up with the DevOps speed. Meanwhile, resolving these security issues can become ever more important and relevant due to increasing levels of application security-related breaches and issues. Therefore, an efficient way of identifying source codes that may access sensitive data, such as a credit card number or a tax identification number.

SUMMARY

One embodiment provides a system for facilitating the identification of sensitive data access based on source-code analysis. During operation, the system can determine whether a repository in a source-code management platform is pertinent to security. If the repository is pertinent to security, the system can determine whether a respective source code file in the repository is pertinent to security. If the source code file is pertinent to security, the system can determine a set of symbols from the source code file and determine, based on the set of symbols, whether the source code file accesses sensitive data. If the source code file accesses sensitive data, the system can present information associated with the source code file in a user interface.

In a variation on this embodiment, the system can determine whether the repository is pertinent to security by applying an exclusion filter to the repository and determining that the repository is irrelevant to security if the exclusion filter matches the repository. Here, the exclusion filter can indicate whether a non-security-related keyword is associated with the repository.

In a variation on this embodiment, the system can determine whether the source code file is pertinent to security by applying, in order, an inclusion filter and an exclusion filter to the source code file. Here, the inclusion filter can indicate whether a security-related keyword is associated with the source code file, and the exclusion filter can indicate whether a non-security-related keyword is associated with the source code file. If the inclusion filter matches the source code file and the exclusion filter does not match the source code file, the system can determine that the source code file is pertinent to security.

In a further variation, the security-related keyword can be represented as a regular expression in the inclusion filter. Furthermore, the non-security-related keyword can be represented as a regular expression in the exclusion filter.

In a variation on this embodiment, the system can determine whether the source code file accesses the sensitive data by generating the set of symbols from the source code file by tokenizing code in the source code file using a tokenizer and applying a set of rules on the set of symbols. Here, a respective rule can correspond to the presence of a keyword indicating the sensitive data. Upon determining a match between the set of rules and a symbol, the system can determine that the source code file accesses the sensitive data.

In a further variation, the tokenizer can be a language-agnostic tokenizer applicable to a plurality of programming languages.

In a further variation, the keyword indicating the sensitive data can be represented as a regular expression in the rule.

In a further variation, the keyword indicating the sensitive data corresponds to one of: a credit card number, a tax identification number (TIN), personally identifiable information, authentication credentials, and personal health information.

In a variation on this embodiment, the system can determine an alert configured to be triggered in response to the source code file accessing sensitive data. If the alert is triggered, the system can present the information in the user interface.

In a variation on this embodiment, the system can determine a set of repositories associated with a tag in the source-code management platform. Here, the tag can correspond to an organization. The system can then traverse a respective repository associated with the tag for determining pertinence to security.

DESCRIPTION OF THE FIGURES

In the figures, like reference numerals refer to the same figure elements.

DETAILED DESCRIPTION

Figure 1:
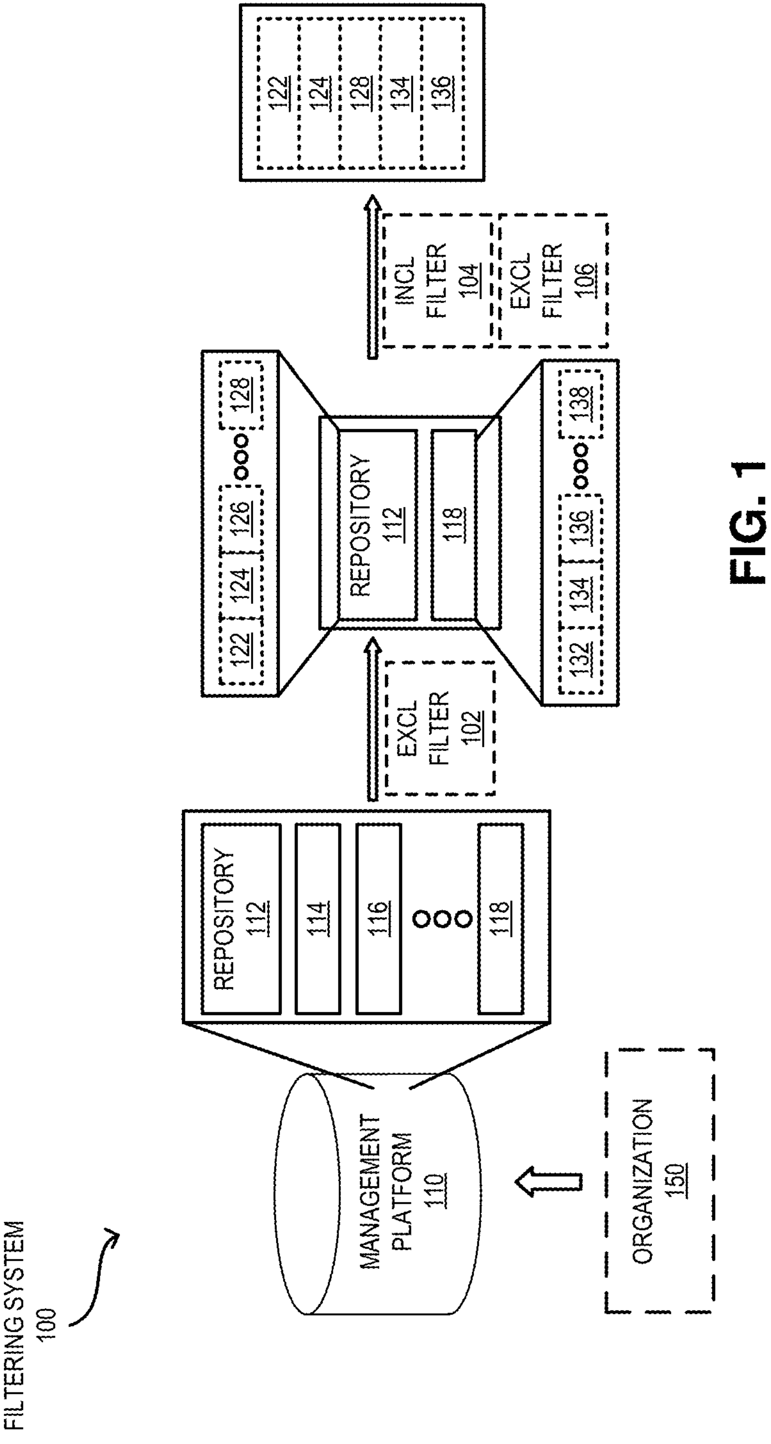
FIG. 1 illustrates an exemplary filtering system supporting automated identification of sensitive data access based on source-code analysis, in accordance with an embodiment of the present application.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

Embodiments of this disclosure provide a code-filtering system, which can be incorporated into a source code management platform, for efficiently detecting source codes that may access sensitive data. As a result, both developers and security teams can support the integration of desired security features while ensuring continuous delivery and deployment pipelines. With existing technologies, the security team of an organization can be responsible for managing a large number of security vulnerabilities. Managing such vulnerabilities on a large scale may complicate the ability of the security team to identify and evaluate the most significant risks. Identifying the order in which the vulnerabilities should be addressed can be challenging because the identification process can require additional context to make more informed decisions about risks. In particular, one of the most important pieces of context for the security team to evaluate the vulnerabilities and risks can be identifying the assets that may process sensitive data. Here, the asset can be any element belonging to the organization.

If the organization uses any computer-based system, such as a piece of software, for managing its operations, the system can operate based on the underlying source codes. Under such circumstances, the assets that typically access sensitive data frequently can be source codes. Therefore, identifying the source codes that may access sensitive data can be of significant importance since the source codes can indicate which sensitive data the system may access. For example, if the organization is to comply with one or more industry regulations and standards, the security team may need to determine whether the access to any sensitive data by a piece of code is in compliance with the regulations. Examples of such regulations can include, but are not limited to, the Payment Card Industry Data Security Standard (PCI-DSS), the General Data Protection Regulation (GDPR), the Health Insurance Portability and Accountability Act (HIPPA), and the California Consumer Privacy Act (CCPA).

Currently, identifying the source codes that may access sensitive data to facilitate additional context to the security team of the organization relies on human interventions. Typically, the security team may ask the development teams to complete surveys, which can be subject to human error, may not incorporate ongoing changes, and may not scale. Furthermore, existing tools may not be capable of identifying all source codes that may access sensitive data. Furthermore, such tools may be limited to the development teams and may rely on invasive integration with the development process, thereby adversely affecting operations.

To address these issues, the code-filtering system can effectively identify the source codes that may access sensitive data. Examples of sensitive data can include, but are not limited to, credit card numbers, tax identification numbers (TINs), personally identifiable information, authentication credentials, and Personal Health Information (PHI). A credit card number can include the fifteen-to-nineteen digit number of the credit card. A TIN can refer to a social security number (SSN) or an employer identification number (EIN). Furthermore, personally identifiable information can include one or more of a first name, a last name, a middle name, a street address, an email address, and a telephone number. The authentication credentials can include a username, a password, a password retrieval phrase (e.g., an answer to a secret question), and a personal identification number (PIN). The PHI information can include any information about a person's medical history, such as an after-visit summary (AVS), test results, and prescribed medications.

The filtering system can access a source code management platform, such as GitHub, used by an organization to manage the source codes of the organization. The platform can provide source code repositories to individual organizations. As a result, an organization may have a large number of source code repositories. The filtering system can efficiently scan the source codes in the repositories provided by the platform and identify the ones that may access sensitive data. Upon identifying such a repository, the filtering system can tag (or label) the repository to indicate that the repository may access sensitive data. Many of the repositories may not be pertinent to privacy or security. Hence, the filtering system can apply an "exclusion" filter on the repositories to determine which repositories may not access sensitive data.

The exclusion filter can include a list of keywords that may indicate that a repository is not pertinent to privacy or security. Examples of the keywords can include, but are not limited to, changelog, demo, documentation, and example. In some embodiments, the list can be represented as a set of regular expressions, each corresponding to a keyword, so that the variants of such keywords can also correspond to the filter. For example, the keyword "example" may be expressed as a regular expression "ex*pl*" that can correspond to phrases "example" and "exmpl." The filtering system can use an Application Programming Interface (API) to access the repositories and determine which repositories correspond to the exclusion filter.

If the platform is GitHub, the filtering system can use a GitHub API to access the repositories, scan a respective repository, and determine whether a match for the exclusion filter is determined. For example, the filtering system can use the GitHub API to traverse the Uniform Resource Locators (URLs) indicating the corresponding repositories of the organization in GitHub. The URL of a repository can indicate the location, owner, and name of the repository. The exclusion filter can then be applied to the owner and name to determine its pertinence. The repositories that do not match the exclusion filter can then represent repositories that may be relevant to privacy or security. In this way, the filtering system can determine a subset of repositories that may be relevant to privacy or security.

The filtering system can then perform further analysis of the relevant subsets of repositories. Typically, a respective repository may comprise a large number of files, which can be source code files. For example, if the source code is for the programming language of Python, the files can be ".py" files. Many of these files may not access sensitive data and, hence, may not be pertinent to privacy or security. To efficiently identify the files that may access sensitive data, the filtering system can apply an "inclusion" filter and an "exclusion" filter. In some embodiments, the exclusion filter can have precedence. As a result, a file selected as pertinent by the inclusion filter can be determined as non-pertinent (or not relevant) by the exclusion filter.

The inclusion filter can include another list of keywords that may indicate that a source code file in a particular repository is pertinent to privacy or security. The keywords can indicate services and capabilities that are typically associated with privacy or security. Examples of the services can include, but are not limited to, Jenkins, Okta, and Redis. Furthermore, examples of the capabilities can include, but are not limited to, administrator, controller, email, and login. In some embodiments, the list can be represented as a set of regular expressions, each corresponding to a keyword, so that the variants of such keywords can also correspond to the filter. For example, the keyword "administrator" may be expressed as a regular expression "adm*" that can correspond to the phrases "admin," "admst," and "administrator." The filtering system can use the API (e.g., the GitHub API) to access the source code files within a respective repository and determine whether a file corresponds to the inclusion filter.

Subsequently, the filtering system can apply the exclusion filter to determine whether the file is not relevant to privacy or security. In some examples, the exclusion filter applied to a file can be the same filter used to exclude the repositories. The inclusion and exclusion filters can be applied to the owner and name of the file to determine its pertinence. If the file matches the inclusion filter and does not match the exclusion filter, the filtering system can determine that the file is relevant to privacy or security. The filtering system can iterate through a respective file in a respective repository to determine which files are relevant to privacy or security. Upon identifying these files, the filtering system can parse and analyze the content of these files using a predetermined set of rules to determine whether the code in a particular file accesses (or processes) sensitive data.

Different organizations may use different programming languages to develop their own system. Furthermore, an individual organization may use a plurality of programming languages. To ensure that the filtering system can apply the set of rules to the source code of a file regardless of the programming language, the filtering system can incorporate a parser that supports language-agnostic parsing. The parser can generate a common intermediate representation of the plurality of programming language formats, thereby facilitating a tenable and scalable parsing process. As a result, the filtering system does not need to include individual parsers for different programming languages.

The parser can include an enhanced source code tokenizer that can generate tokens indicating the types, variables, and call identifiers. In some embodiments, the tokens can be represented as an array of symbols. Suppose that a source code file includes the following piece of Python source code:

```
log.info(f"{user.email} purchased using ccn: {user.ccn}")
```

When the enhanced tokenizer is applied to the source code, the source code is divided into an array of symbols, such as (abbreviated for readability):

```
['log', '.', 'info', '(', . . . '.', 'email','}', . . . 'ccn','}']
```

Here, the keywords and identifiers of significance are delineated, such as the log package name, the method name, and both the email and credit card number (CCN) fields. The filtering system can then apply the set of rules on the array of symbols corresponding to the sequence of tokens. A respective rule in the set of rules can be used to detect the presence of a keyword indicative of sensitive data. The rule can be indicated by a corresponding regular expression representing the keyword. When the rule is applied to the source code, the regular expression is compared against the array of symbols generated from the source code. If the regular expression matches a symbol in the array, the filtering system can determine that the keyword is present in the source code.

For example, a rule can correspond to the keyword "CCN." The rule can be used to identify the processing of credit card numbers. A case-insensitive regular expression can be dynamically derived from the keyword "CCN" in such a way that the most common variants of the phrase "CCN" can be identified based on the regular expression. Here, the keyword "CCN" may be expressed as a regular expression "*CCN*" that can correspond to phrases "getCCN," "setCon," "readcon," and "writeCCN." If the filtering system identifies such a keyword in a source code, the filtering system can determine that the corresponding source code file processes or accesses at least one piece of sensitive data and tag or label the file accordingly. In this way, the filtering system can parse a respective file that has been identified as pertinent to privacy or security by the inclusion and exclusion filters and determine the presence of source code that accesses or processes sensitive data.

The filtering system can present a respective tagged file on a user interface to a user. Examples of the user interface can include, but are not limited to, a textual interface, a graphical interface, a holographic interface, and a virtual or augmented reality interface. The user interface can include a dashboard that can present information associated with the tagged file. The information can include, but is not limited to, the name of the file, the name of a function or method comprising a keyword, a variable name corresponding to the keyword, and the associated line number(s).

The filtering system can also issue an alert to the user when such a file is determined by the filtering system. The user may set alerting policies focused on privacy and compliance (e.g., PCI compliance). For example, an alerting policy can trigger a notification if a vulnerability associated with sensitive data processing has been exposed for more than X days. The user can utilize the dashboard to obtain the information in the desired format. The dashboard can indicate the most vulnerable repositories processing sensitive data (e.g., top ten vulnerable repositories), the percentage of projects or repositories not in compliance with a particular standard, and the projects at risk of exposing sensitive data. Furthermore, the dashboard may provide responses to graph queries, such as a list of all repositories processing sensitive data, or a list of severe vulnerabilities associated with repositories processing sensitive data.

FIG. 1 illustrates an exemplary filtering system supporting automated identification of sensitive data access based on source-code analysis, in accordance with an embodiment of the present application. In this example, an organization 150 uses any computer-based system, such as a piece of software, for managing its operations. Therefore, organization 150 may use a management platform 110, such GitHub, to store their source code files. The source codes can be stored in a number of code repositories, which can include repositories 112, 114, 116, and 118. Repositories 112, 114, 116, and 118 can be tagged with a tag (e.g., a GitHub tag) that identifies them to be associated with organization 150. If organization 150 obtains and processes sensitive data (e.g., CCNs from users), the security team of organization 150 can be responsible for managing a large number of security vulnerabilities. Managing such vulnerabilities across repositories 112, 114, 116, and 118 can require additional context to make more informed decisions about risks.

In particular, one of the most important pieces of context for the security team to evaluate the vulnerabilities and risks can be identifying repositories 112, 114, 116, and 118 and their respective source code files that may process sensitive data. Examples of sensitive data can include, but are not limited to, credit card numbers, TINs (e.g., SSNs and EINs), personally identifiable information, authentication credentials, and PHI. Typically, the security team may ask the respective development teams associated with repositories 112, 114, 116, and 118 to complete surveys, which can be subject to human error, may not incorporate ongoing changes, and may not be scaled. Furthermore, existing tools may not be capable of identifying all source code files in repositories 112, 114, 116, and 118 that may access sensitive data. Furthermore, such tools may be limited to the development teams and may rely on invasive integration with the development process, thereby adversely affecting operations.

To address these issues, code-filtering system 100 can effectively identify, in repositories 112, 114, 116, and 118, the source codes that may access sensitive data. Filtering system 100 can access management platform 110, such as GitHub, using an API supported by management platform 110. Filtering system 100 can scan the source codes in repositories 112, 114, 116, and 118 provided by management platform 110. Filtering system 100 can identify the repositories comprising source codes that may access sensitive data. Some of repositories 112, 114, 116, and 118 may not be pertinent to privacy or security. Hence, filtering system 100 can apply an exclusion filter 102 on repositories 112, 114, 116, and 118 to determine which repositories may not access sensitive data.

Exclusion filter 102 can include a list of keywords that may indicate that a repository, such as repository 112, is not pertinent to privacy or security. Examples of the keywords can include, but are not limited to, changelog, demo, documentation, and example. In some embodiments, the list corresponding to exclusion filter 102 can be represented as a set of regular expressions, each corresponding to a keyword, so that the variants of such keywords can also correspond to the filter. For example, the keyword "example" may be expressed as a regular expression "ex*pl*" that can correspond to phrases "example" and "exmpl."

Filtering system 100 can use the API to traverse the URLs indicating repositories 112, 114, 116, and 118 in management platform 110. The URL of repository 112 can indicate the location, owner, and name of repository 112. Exclusion filter 102 can then be applied to the owner and name to determine whether a keyword indicated in exclusion filter 102 is indicated by the URL of repository 112. If a match is found, repository 112 can be related to a non-pertinent item, such as changelog, demo, documentation, and example, and hence, can be excluded. On the other hand, if a match is not found, repository 112 may be relevant to privacy or security. By traversing the URLs indicating repositories 112, 114, 116, and 118, filtering system 100 can determine which repositories do not match exclusion filter 102, which may be relevant to privacy or security. Suppose that filtering system 100 determines that repositories 114 and 116 match exclusion filter 102. Accordingly, filtering system 100 can determine a subset of repositories 112 and 118 that may be relevant to privacy or security.

Filtering system 100 can then perform further analysis of repositories 112 and 118. Typically, a respective repository may comprise a large number of files, which can be source code files (e.g., "py" files for Python). In this example, repository 112 can include source code files 122, 124, 126, and 128, and repository 118 can include source code files 132, 134, 136, and 138. Many of these files may not access sensitive data and, hence, may not be pertinent to privacy or security. To efficiently identify the source code files that may access sensitive data, filtering system 100 can apply an inclusion filter 104 and an exclusion filter 106. Here, exclusion filter 106 can have precedence over inclusion filter 104. As a result, a file selected as pertinent by inclusion filter 104 can be determined as non-pertinent (or not relevant) by exclusion filter 106.

Inclusion filter 104 can include another list of keywords that may indicate that a source code file in a particular repository (e.g., source code file 122 in repository 112) is pertinent to privacy or security. The keywords can indicate services (e.g., Jenkins, Okta, and Redis) and capabilities (e.g., administrator, controller, email, and login) that are typically associated with the privacy or security of organization 150. In some embodiments, a respective keyword in the list can be represented as a regular expression. As a result, the variants of the keywords can also be incorporated into inclusion filter 104. For example, the keyword "administrator" may be expressed as a regular expression "adm*" that can correspond to the phrases "admin," "admst," and "administrator." Filtering system 100 can use the API (e.g., the GitHub API) to access the source code files within a respective repository. For example, filtering system 100 can determine whether source code file 122 in repository 112 matches one or more of the keywords in the list and corresponds to inclusion filter 104.

Subsequently, filtering system 100 can apply exclusion filter 106 to determine whether source code file 122 is not relevant to privacy or security. In some examples, exclusion filter 106 can be the same filter as exclusion filter 102. Filtering system 100 can apply inclusion filter 104 and exclusion filter 106 on the URL of source code file 122 and determine whether the owner and name of source code file 122 indicate relevance to privacy or security. If source code file 122 matches inclusion filter 104 and does not match exclusion filter 106, filtering system 100 can determine that source code file 122 is relevant to privacy or security. Filtering system 100 can then iterate through source code files 124, 126, and 128 in repository 112 to determine which files are relevant to privacy or security. Similarly, filtering system 100 can iterate through source code files 132, 134, 136, and 138 in repository 118 to determine which files are relevant to privacy or security.

Suppose that source code files 122, 124, 128, 134, and 136 match inclusion filter 104 and do not match exclusion filter 106. Hence, filtering system 100 can determine that source code files 122, 124, 128, 134, and 136 are relevant to privacy or security. Upon identifying these files, filtering system 100 can parse and analyze the content of these files using a predetermined set of rules to determine whether the code in a particular file accesses (or processes) sensitive data.

Figure 2:
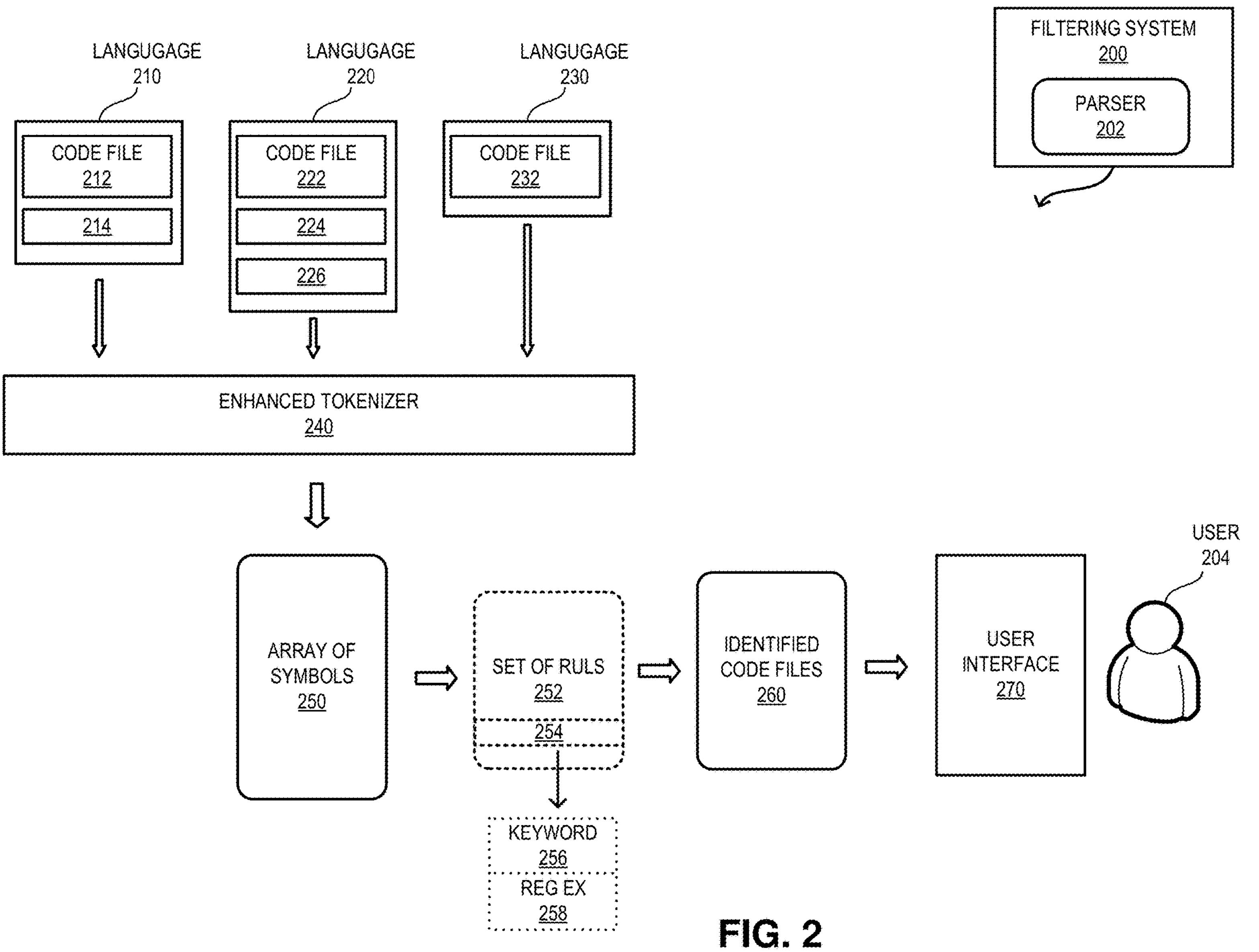
FIG. 2 illustrates an exemplary enhanced language-agnostic tokenizer for identifying keywords in source codes, in accordance with an embodiment of the present application.

FIG. 2 illustrates an exemplary enhanced language-agnostic tokenizer for identifying keywords in source codes, in accordance with an embodiment of the present application. A filtering system 200 can be used to efficiently identify sensitive data access based on source-code analysis. Filtering system 200 can be used by different organizations using different programming languages. Furthermore, an individual organization using filtering system 200 may use a plurality of programming languages. To ensure that filtering system 200 can perform the source-code analysis across multiple languages, filtering system 200 can incorporate a parser 202 that supports language-agnostic parsing. To facilitate a tenable and scalable parsing process, parser 202 can generate a common intermediate representation of the plurality of programming language formats, thereby. As a result, filtering system 200 does not need to include individual parsers for different programming languages.

During operation, parser 202 can parse source code files 212 and 214 of programming language 210, source code files 222, 224, and 226 of programming language 220, and source code file 232 of programming language 230. Parser 202 can include an enhanced source code tokenizer 240 that can generate tokens indicating the types, variables, and call identifiers. In some embodiments, the tokens can be represented as an array of symbols 250. Here, array of symbols 250 can correspond to the sequence of tokens generated by code tokenizer 240.

If language 210 is C, source code file 212 may include source code in Python. Suppose that source code file 212 includes the following piece of Python source code:

log.info(f"{user. email} purchased using ccn: {user.ccn}")

When enhanced tokenizer 240 is applied to the source code, enhanced tokenizer 240 can divide the source code an array of symbols, such as (abbreviated for readability):

['log', '.', 'info', '(', . . . '.', 'email','}', . . . 'ccn','}']

In the same way, enhanced tokenizer 240 can tokenize each of source code files 214, 222, 224, 226, and 232 and generate a corresponding array of symbols. Here, enhanced tokenizer 240 can delineate the keywords and identifiers of significance in each of the source code files. Enhanced tokenizer 240, therefore, can generate the symbols (or tokens) that can be representative of the content of the corresponding source file. Filtering system 200 can then further analyze the symbols using a predetermined set of rules 252 to determine whether the code in a particular file accesses (or processes) sensitive data.

Suppose that enhanced tokenizer 240 generates array of symbols 250 from source code file 212. Filtering system 200 can apply set of rules 252 on array of symbols 250. A respective rule, such as rule 254, in set of rules 252 can be used to detect the presence of a keyword 256 indicative of sensitive data. Here, keyword 256 can be a keyword of interest representing a piece of sensitive data, such as a CCN, a TIN, personally identifiable information, an authentication credential, or PHI. Rule 254 can be indicated by a corresponding regular expression 258 representing keyword 256. When rule 254 is applied to source code file 212, regular expression 258 is compared against array of symbol 250. If regular expression 258 matches a symbol in array of symbols 250, filtering system 200 can determine that keyword 256 is present in source code file 212.

For example, keyword 256 can include the phrase "CCN." Hence, rule 254 can correspond to keyword "CCN." Rule 254 can be used to identify the processing of credit card numbers. Regular expression 258 can be a case-insensitive regular expression can be dynamically derived from keyword 256. Since the keyword is the phrase "CCN," regular expression 258 can be derived in such a way that the most common variants of the phrase "CCN" can be identified based on regular expression 256. Here, regular expression 258 can be "*CCN*" corresponding to phrases "getCCN," "setCon," "readcon," and "writeCCN." If filtering system 200 identifies keyword 256 in source code file 212, filtering system 200 can determine that source code file 212 processes or accesses at least one piece of sensitive data.

Filtering system 200 can then tag or label source code file 212 to indicate that the source code in source code file 212 processes or accesses sensitive data. In the same way, parser 202 can parse source code files 214, 222, 224, 226, and 232 and determine whether a respective of these files accesses or processes sensitive data. In this way, filtering system 200 can generate a set of identified code files 260. Here, each source code file in identified code files 260 has been determined to be accessing or processing at least one piece of sensitive data. Filtering system 200 can then present can present identified code files 260 on a user interface 270 to a user 204. For example, user interface 270 can show the name, repository, and URL of a respective source code file in identified code files 260. User 204 can then inspect and analyze a respective source code file in identified code files 260 using user interface 270.

Figure 3:
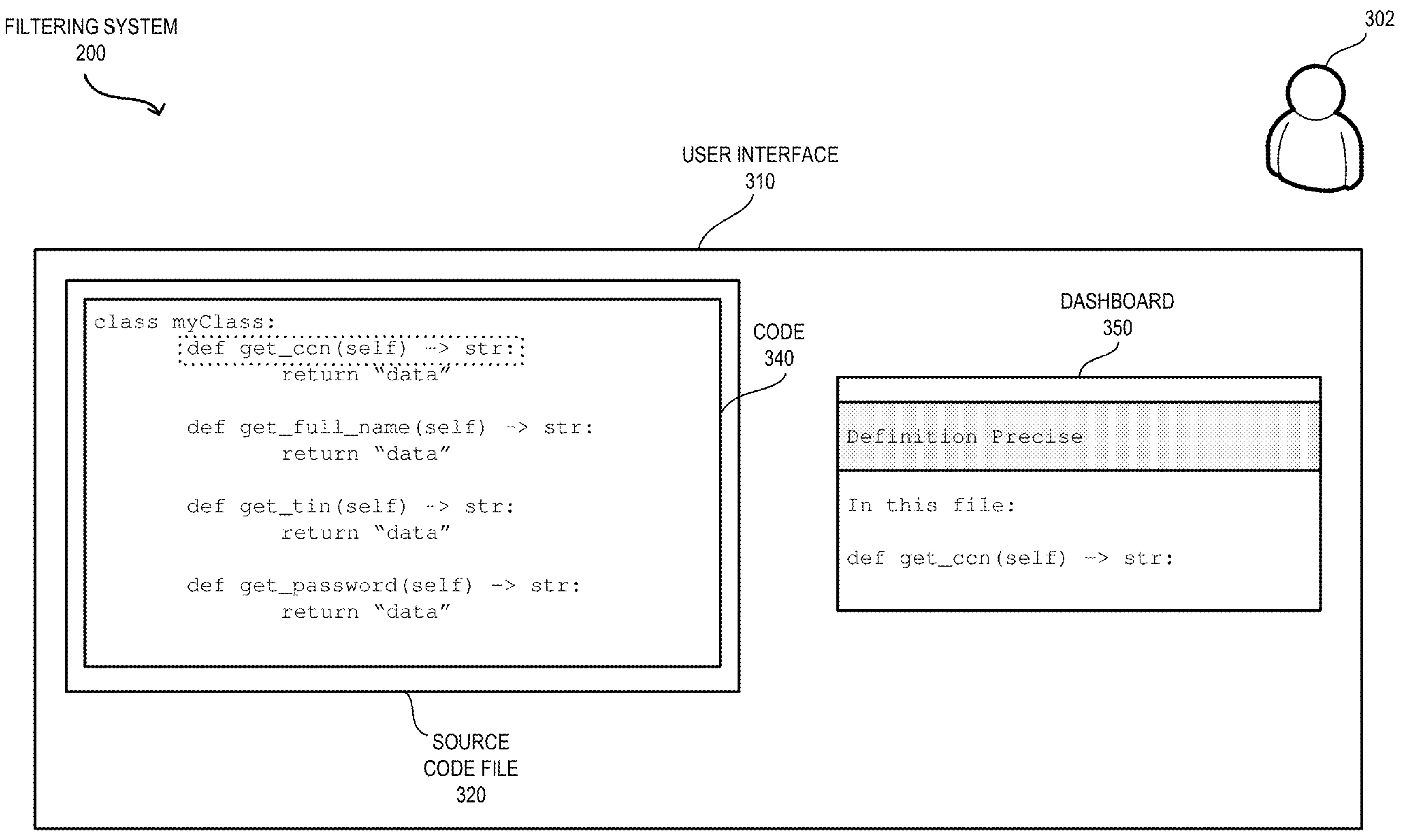
FIG. 3 illustrates an exemplary user interface for presenting information indicating sensitive data access, in accordance with an embodiment of the present application.

FIG. 3 illustrates an exemplary user interface for presenting information indicating sensitive data access, in accordance with an embodiment of the present application. A filtering system 300 can support user interface 310 that can present a respective source code file comprising code accessing sensitive data to a user 302. Here, user interface 300 can correspond to user interface 270 of FIG. 2. In this example, user interface 310 can present source code file 320 comprising a piece of code 340 that accesses sensitive data. Examples of user interface 310 can include, but are not limited to, a textual interface, a graphical interface, a holographic interface, and a virtual or augmented reality interface. User interface 310 can include a dashboard 350 that can present information associated with source code file 320.

If a line matches a particular keyword indicating accessing of sensitive data, user interface 310 can highlight the line of code 340. For example, filtering system 300 can detect the keyword "CCN" in a line in code 340 by matching a case-insensitive regular expression, as described in conjunction with FIG. 2. User interface 310 can then highlight the line comprising the phrase "CCN" (denoted with dotted lines). In addition, dashboard 350 can present information associated with the highlighted line. The information can include, but is not limited to, the name of the file, the name of a function or method comprising a keyword, a variable name corresponding to the keyword, and the associated line number(s).

Filtering system 300 can also issue an alert to user 302 when source code file 320 is determined by filtering system 300. User 302 may set alerting policies focused on privacy and compliance (e.g., PCI compliance). For example, an alerting policy can trigger a notification on user interface 310 if a vulnerability indicated in code 340 has been exposed for more than X days. User 302 can utilize dashboard 350 to obtain the information in the desired format. Dashboard 350 can indicate the most vulnerable repositories processing sensitive data (e.g., top ten vulnerable repositories), the percentage of projects or repositories not in compliance with a particular standard, and the projects at risk of exposing sensitive data. Furthermore, dashboard 350 may provide responses to graph queries, such as a list of all repositories processing sensitive data, or a list of severe vulnerabilities associated with repositories processing sensitive data.

Figure 4A:
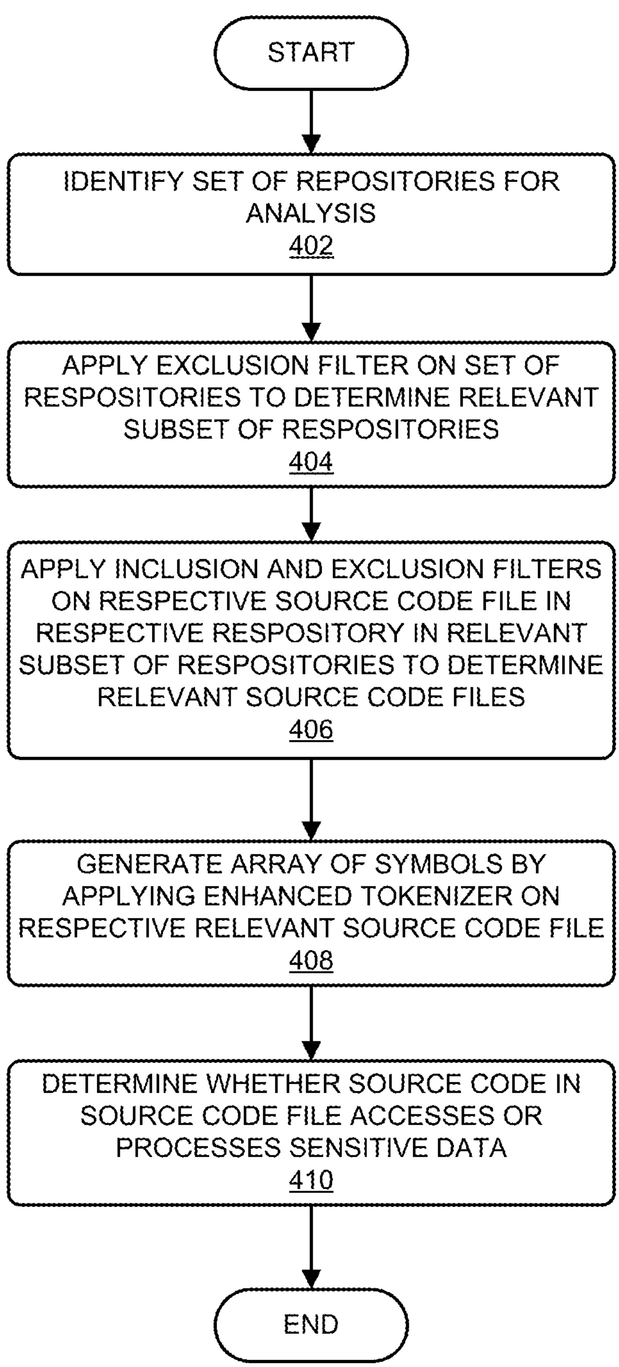
FIG. 4A presents a flowchart illustrating a method of a filtering system determining whether the source code in a code file accesses sensitive data, in accordance with an embodiment of the present application.

FIG. 4A presents a flowchart illustrating a method of a filtering system determining whether the source code in a code file accesses sensitive data, in accordance with an embodiment of the present application. During operation, the filtering system can identify a set of repositories for analysis (operation 402). The set of repositories can be associated with an organization. The filtering system may identify a repository to be associated with the organization based on a tag associated with the repository. In the example in FIG. 1, repositories 112, 114, 116, and 118 can be selected by filtering system 100 for analysis. The filtering system can then apply an exclusion filter on the set of repositories to determine a relevant subset of repositories (operation 404). In the example in FIG. 1, filtering system 100 can apply an exclusion filter 102 on repositories 112, 114, 116, and 118 to determine repositories 112 and 118 as relevant.

The filtering system can then apply an inclusion filter and an exclusion filter on a respective source code file in a respective repository in the relevant subset of repositories to determine the relevant source code files (operation 406). In the example in FIG. 1, filtering system 100 can apply an inclusion filter 104 and exclusion filter 106 on source code files 122, 124, 126, and 128 in repository 112, and source code files 132, 134, 136, and 138 in repository 118. Based on filters 104 and 106, filtering system 100 can determine source code files 122, 124, 128, 134, and 136 to be relevant.

Subsequently, the filtering system can generate an array of symbols by applying an enhanced tokenizer on a respective source code file (operation 408). In the example in FIG. 2, filtering system 200 can determine array of symbols 250 from source code file 212 by applying enhanced tokenizer 240 on source code file 212. The filtering system can determine whether the source code in a source code file accesses or processes sensitive data (operation 410). In the example in FIG. 2, filtering system 200 can apply set of rules 252 on array of symbols 250 to determine whether source code file 212 accesses or processes sensitive data.

Figure 4B:
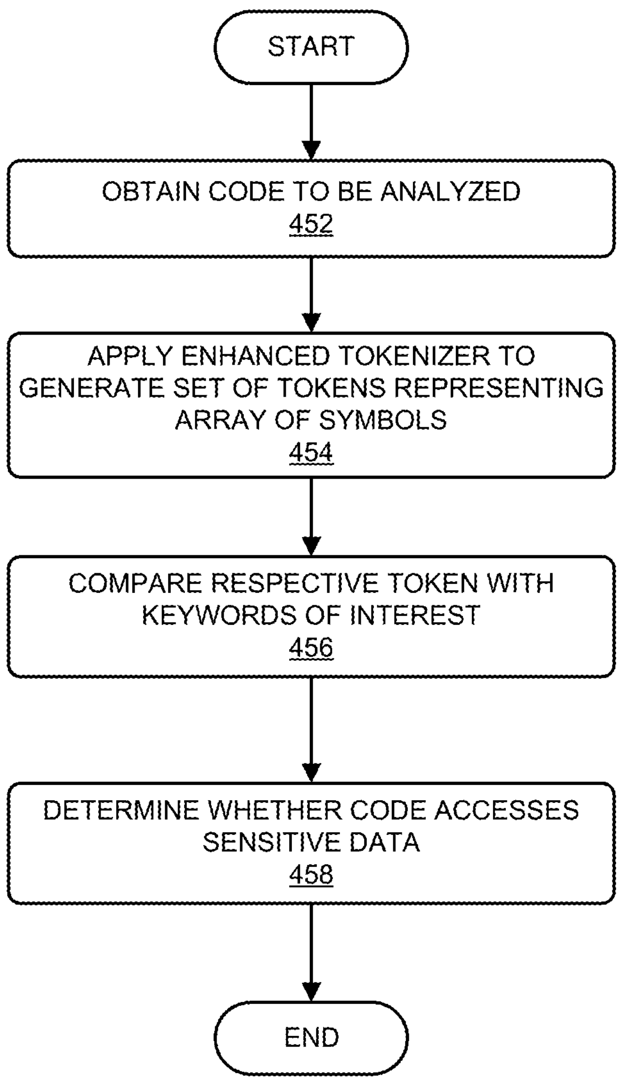
FIG. 4B presents a flowchart illustrating a method of a filtering system applying an enhanced language-agnostic tokenizer for identifying keywords in source codes, in accordance with an embodiment of the present application.

FIG. 4B presents a flowchart illustrating a method of a filtering system applying an enhanced language-agnostic tokenizer for identifying keywords in source codes, in accordance with an embodiment of the present application. During operation, the system can obtain the code to be analyzed (operation 452) and apply an enhanced tokenizer to generate a set of tokens representing an array of symbols (operation 454). In the example in FIG. 2, filtering system 200 can determine array of symbols 250 from source code file 212 by applying enhanced tokenizer 240 on source code file 212. The system can compare a respective token with the keyword of interest (operation 456) and determine whether the code accesses sensitive data (operation 458). In the example in FIG. 2, filtering system 200 can determine whether keyword 256 is present in source code file 212.

Figure 5:
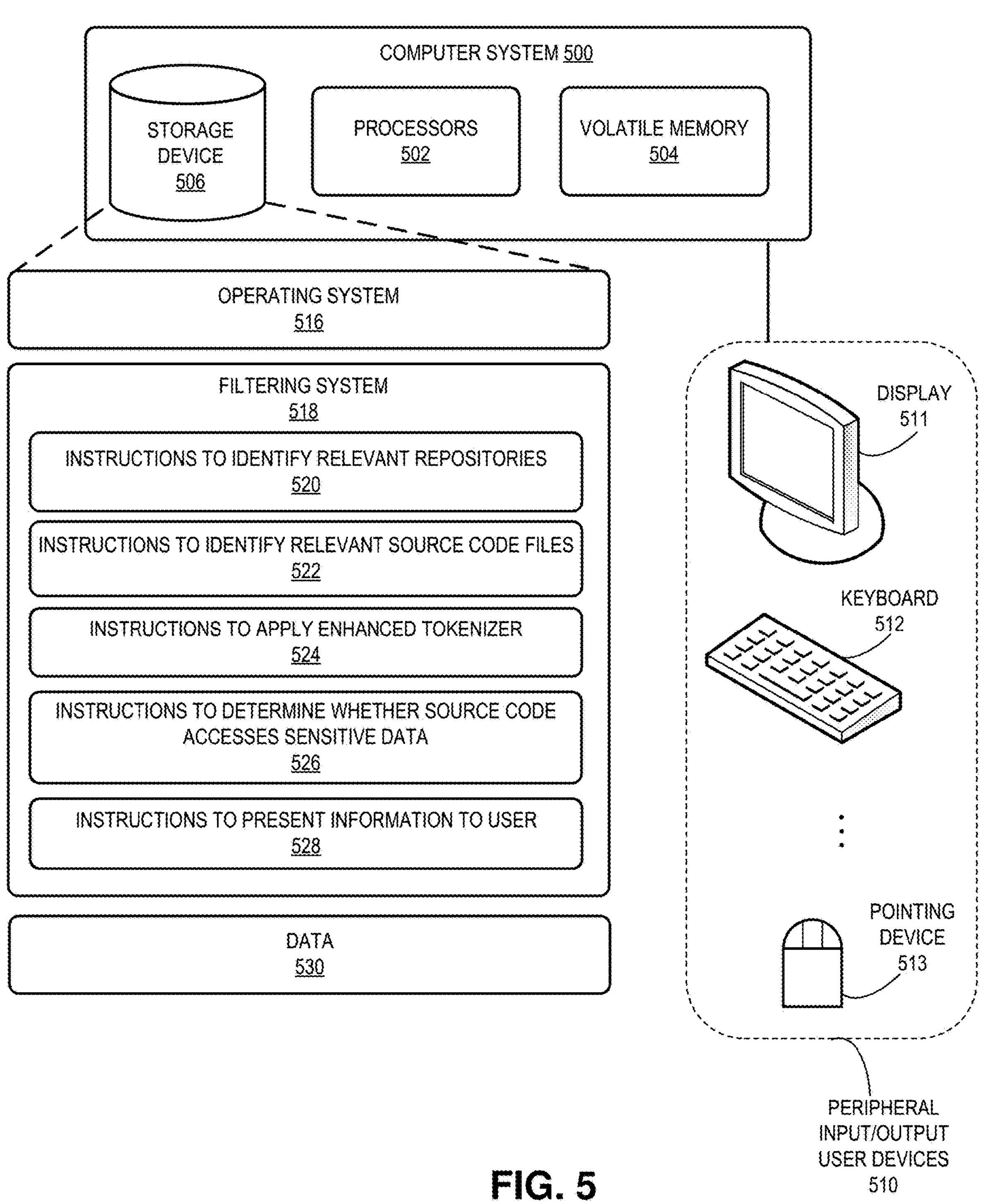
FIG. 5 illustrates an exemplary computer system supporting a filtering system supporting automated identification of sensitive data access based on source-code analysis, in accordance with an embodiment of the present application.

FIG. 5 illustrates an exemplary computer system supporting a filtering system supporting automated identification of sensitive data access based on source-code analysis, in accordance with an embodiment of the present application. Computer system 500 includes one or more processors 502, a memory 504, and a storage device 506 Processors 502 can include one or more processing resources, such as processor cores and accelerators. Memory 504 can include a volatile memory (e.g., random access memory (RAM)) that serves as a managed memory and can be used to store one or more memory pools. Furthermore, computer system 500 can be coupled to peripheral I/O user devices 510 (e.g., a display device 511, a keyboard 512, and a pointing device 513). Storage device 506 includes a non-transitory computer-readable storage medium and stores an operating system 516, filtering system 518, and data 530. Computer system 500 may include fewer or more entities or instructions than those shown in FIG. 5.

Filtering system 518 can include instructions, which when executed by computer system 500, can cause computer system 500 to perform methods and/or processes described in this disclosure. Filtering system 518 can be executed on at least one of processors 502. Filtering system 518 can correspond to filtering systems 100, 200, and 300 in FIGS. 1, 2, and 3, respectively. Specifically, filtering system 518 may include instructions 520 to identify the relevant repositories. In the example in FIG. 1, filtering system 100 can apply an exclusion filter 102 on repositories 112, 114, 116, and 118 to determine repositories 112 and 118 as relevant.

Filtering system 518 may also include instructions 522 to determine relevant source code files. In the example in FIG. 1, filtering system 100 can apply an inclusion filter 104 and exclusion filter 106 on source code files 122, 124, 126, and 128 in repository 112, and source code files 132, 134, 136, and 138 in repository 118. Based on filters 104 and 106, filtering system 100 can determine source code files 122, 124, 128, 134, and 136 to be relevant. Furthermore, filtering system 518 may also include instructions 524 to apply an enhanced tokenizer. In the example in FIG. 2, filtering system 200 can determine array of symbols 250 from source code file 212 by applying enhanced tokenizer 240 on source code file 212.

Filtering system 518 may include instructions 526 to determine whether a source code accesses sensitive data. In the example in FIG. 2, filtering system 200 can determine whether keyword 256 is present in source code file 212 to determine whether it accesses sensitive data. Moreover, filtering system 518 may include instructions 528 to present information associated with the source code to a user. In the example in FIG. 3, user interface 300 can present information associated with code 340 to user 302. Data 530 can include any data that is required as input, or that is generated as output by the methods, operations, communications, and/or processes described in this disclosure. Specifically, data 530 can include information indicating inclusion and exclusion filters, an array of symbols, and a set of rules. Data 530 can also include any alerts set for displaying information.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A computer-implemented method for facilitating identification of sensitive data access based on source-code analysis, the method comprising:

determining whether a repository in a source-code management platform is pertinent to security;

in response the repository being pertinent to security, determining whether a respective source code file in the repository is pertinent to security;

in response the source code file being pertinent to security:

determining a set of symbols from the source code file; and determining, based on the set of symbols, whether the source code file accesses sensitive data; and in response to the source code file accessing sensitive data, presenting information associated with the source code file in a user interface, wherein determining whether the source code file accesses the sensitive data comprises:

generating the set of symbols from the source code file by tokenizing code in the source code file using a tokenizer;

applying a set of rules on the set of symbols, wherein a respective rule corresponds to presence of a keyword indicating the sensitive data; and in response to determining a match between the set of rules and a symbol, determining that the source code file accesses the sensitive data, wherein the tokenizer is a language-agnostic tokenizer applicable to a plurality of programming languages.

2. The computer-implemented method of claim 1, wherein determining whether the repository is pertinent to security comprises:

applying an exclusion filter to the repository, wherein the exclusion filter indicates whether a non-security-related keyword is associated with the repository; and in response to the exclusion filter matching the repository, determining that the repository is irrelevant to security.

3. The computer-implemented method of claim 1, wherein determining whether the source code file is pertinent to security comprises:

applying, in order, an inclusion filter and an exclusion filter to the source code file, wherein the inclusion filter indicates whether a security-related keyword is associated with the source code file, and wherein the exclusion filter indicates whether a non-security-related keyword is associated with the source code file; and in response to the inclusion filter matching the source code file and the exclusion filter not matching the source code file, determining that the source code file is pertinent to security.

4. The computer-implemented method of claim 3, wherein the security-related keyword is represented as a regular expression in the inclusion filter, and wherein the non-security-related keyword is represented as a regular expression in the exclusion filter.

5. The computer-implemented method of claim 1, wherein the keyword indicating the sensitive data is represented as a regular expression in the rule.

6. The computer-implemented method of claim 1, wherein the keyword indicating the sensitive data corresponds to one of:

a credit card number;

a tax identification number (TIN);

personally identifiable information;

authentication credentials; and personal health information.

7. The computer-implemented method of claim 1, further comprising:

determining an alert configured to be triggered in response to the source code file accessing sensitive data; and presenting the information in the user interface in response to the alert being triggered.

8. The computer-implemented method of claim 1, further comprising:

determining a set of repositories associated with a tag in the source-code management platform, wherein the tag corresponds to an organization; and traversing a respective repository associated with the tag for determining pertinence to security.

9. A non-transitory computer-readable storage medium storing instructions that when executed by a processor of a computing system cause the processor to perform a method, the method comprising:

determining whether a repository in a source-code management platform is pertinent to security;

in response the repository being pertinent to security, determining whether a respective source code file in the repository is pertinent to security;

in response the source code file being pertinent to security:

determining a set of symbols from the source code file; and determining, based on the set of symbols, whether the source code file accesses sensitive data; and in response to the source code file accessing sensitive data, presenting information associated with the source code file in a user interface, wherein determining whether the source code file accesses the sensitive data comprises:

generating the set of symbols from the source code file by tokenizing code in the source code file using a tokenizer;

applying a set of rules on the set of symbols, wherein a respective rule corresponds to presence of a keyword indicating the sensitive data; and in response to determining a match between the set of rules and a symbol, determining that the source code file accesses the sensitive data, wherein the tokenizer is a language-agnostic tokenizer applicable to a plurality of programming languages.

10. The non-transitory computer-readable storage medium of claim 9, wherein determining whether the repository is pertinent to security comprises:

applying an exclusion filter to the repository, wherein the exclusion filter indicates whether a non-security-related keyword is associated with the repository; and in response to the exclusion filter matching the repository, determining that the repository is irrelevant to security.

11. The non-transitory computer-readable storage medium of claim 9, wherein determining whether the source code file is pertinent to security comprises:

applying, in order, an inclusion filter and an exclusion filter to the source code file, wherein the inclusion filter indicates whether a security-related keyword is associated with the source code file, and wherein the exclusion filter indicates whether a non-security-related keyword is associated with the source code file; and in response to the inclusion filter matching the source code file and the exclusion filter not matching the source code file, determining that the source code file is pertinent to security.

12. The non-transitory computer-readable storage medium of claim 11, wherein the security-related keyword is represented as a regular expression in the inclusion filter, and wherein the non-security-related keyword is represented as a regular expression in the exclusion filter.

13. The non-transitory computer-readable storage medium of claim 9, wherein the keyword indicating the sensitive data is represented as a regular expression in the rule.

14. The non-transitory computer-readable storage medium of claim 9, wherein the keyword indicating the sensitive data corresponds to one of:

a credit card number;

a tax identification number (TIN);

personally identifiable information;

authentication credentials; and personal health information.

15. The non-transitory computer-readable storage medium of claim 9, wherein the method further comprises:

determining an alert configured to be triggered in response to the source code file accessing sensitive data; and presenting the information in the user interface in response to the alert being triggered.

16. The non-transitory computer-readable storage medium of claim 9, wherein the method further comprises:

determining a set of repositories associated with a tag in the source-code management platform, wherein the tag corresponds to an organization; and traversing a respective repository associated with the tag for determining pertinence to security.

17. A computer system, comprising:

a processor;

a non-transitory computer-readable storage medium storing instructions that when executed by the processing resource cause the computer system to:

determine whether a repository in a source-code management platform is pertinent to security;

in response the repository being pertinent to security, determine whether a respective source code file in the repository is pertinent to security;

in response the source code file being pertinent to security:

determine a set of symbols from the source code file; and determine, based on the set of symbols, whether the source code file accesses sensitive data; and in response to the source code file accessing sensitive data, present information associated with the source code file in a user interface, wherein determining whether the source code file accesses the sensitive data comprises:

generating the set of symbols from the source code file by tokenizing code in the source code file using a tokenizer;

applying a set of rules on the set of symbols, wherein a respective rule corresponds to presence of a keyword indicating the sensitive data; and in response to determining a match between the set of rules and a symbol, determining that the source code file accesses the sensitive data, wherein the tokenizer is a language-agnostic tokenizer applicable to a plurality of programming languages.

* * * * *